United States Patent Office 3,133,939 Patented May 19, 1964

3,133,939

MANUFACTURE OF 2,3-DICYANO-5,6-DICHLOROBENZOQUINONE AND INTERMEDIATE THEREFOR

Peter W. D. Mitchell, Mount Royal, Quebec, Canada, assignor to American Home Products Corporation, New York, N.Y., a corporation of Delaware No Drawing. Filed May 24, 1961, Ser. No. 112,177
4 Claims. (Cl. 260—396)

This invention relates to new and improved methods for preparing 2,3-dicyano-5,6-dichlorobenzoquinone, a compound which has recently been found to be of considerable value as an oxidation and dehydrogenation reagent. For example, it has been used to oxidize allylic alcohols to $\alpha,\beta$-unsaturated ketones and to dehydrogenate partially aromatic ring systems. By the processes of my invention I am able to prepare this compound in fewer steps and with considerably less manipulation than the prior art processes called for. A further advantage of my new processes is that they require considerably less time than was formerly necessary.

The new process may be outlined schematically as follows:

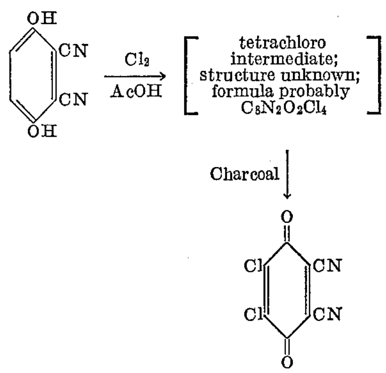

As will be seen from the foregoing, the starting material in this manufacture of 2,3-dicyano-5,6-dichlorobenzoquinone is 2,3-dicyanohydroquinone, which may be prepared from benzoquinone as taught by Helferich and Bodenbender, Ber., 56B, 1112 (1923); Chem. Abs., 17, 3175 (1923).

2,3-dicyanohydroquinone is chlorinated by passing gaseous chlorine into its solution in refluxing acetic acid. A precipitate of 2,3-dicyano-5,6-dichlorohydroquinone is formed, but redissolves as the introduction of chlorine is continued, and the solution then contains a tetrachloro intermediate whose exact structure and compositions I have been unable to elucidate completely. It appears to be monomolecular and to have a composition corresponding approximately to $C_8N_2O_2Cl_4$. Heating and agitating a solution of this tetrachloro intermediate in benzene with charcoal converts it to 2,3-dicyano-5,6-dichlorobenzoquinone. Preferably, this conversion is conducted in the presence of a drying agent and an acid acceptor; anhydrous magnesium sulfate is a satisfactory drying agent for this step, as is also partially dehydrated gypsum. Powdered calcium carbonate is preferred as the acid acceptor, but magnesium carbonate or barium carbonate may also be used.

The following examples illustrate this invention:

*Example 1*

Twenty grams of 2,3-dicyanohydroquinone is dissolved in 200 ml. of gently refluxing glacial acetic acid contained in a three-neck flask fitted with a stirrer, gas inlet tube, and condenser. Chlorine is passed in until the solid which is initially formed redissolves (about 100 minutes). The solution is cooled to room temperature, and 50 ml. of chloroform is added; this causes about 4.5 g. of 2,3-dicyano-5,6-dichlorohydroquinone to separate. This 2,3-dicyano-5,6-dichlorohydroquinone may be recycled to a succeeding batch for further chlorination, or may be oxidized directly to 2,3-dicyano-5,6-dichlorobenzoquinone by agitating it at room temperature with an excess of lead dioxide and a mixture of dilute aqueous hydrochloric acid and a water-immiscible non-polar solvent, preferably benzene, as described in my co-pending application of Serial No. 105,864, filed April 27, 1961.

Evaporation of the filtrate separated from the 2,3-dicyano-5,6-dichlorohydroquinone gives a syrup which is refluxed for 30 minutes in 250 ml. of benzene containing ten grams each of charcoal, calcium carbonate, and anhydrous magnesium sulfate. The suspension is then stirred for 16 hours at room temperature and filtered. Concentration of the filtrate to a small volume (about 10 ml.) and dilution of the residue with chloroform (20 ml.) yields 7 g. of 2,3-dicyano-5,6-dichlorobenzoquinone, a yield of 24%. The melting point is 198–202° C.

*Example 2*

The syrup obtained from the chlorination of 20 g. of 2,3-dicyanohydroquinone as in Example 1 is triturated with benzene and n-hexane. A sticky solid (20 g.) is obtained, which can be crystallized from n-hexane as colorless crystals melting at 130–132° C. It is readily soluble in ether, ethanol, benzene, and chloroform, but is insoluble in water. It sublimes unchanged at 100° C. and 0.1 mm. Hg.

Calculated for $C_8N_2O_2Cl_4$: Cl=47.60%; N=9.40%. Found: Cl=47.77, 48.07, 47.06, 47.22; N=9.36, 9.23, 9.51.

*Example 3*

The product of Example 2 (one gram) in 20 ml. of benzene is refluxed for 40 minutes with 1 g. of charcoal. The solution becomes dark red in color. The charcoal is filtered off and the filtrate is concentrated to about 4 ml. This yields red crystals of 2,3-dicyano-5.6-dichlorobenzoquinone which become yellow after drying, melting at 210–213° C. The yield is 0.55 g., or about 73% of theoretical. The product crystallizes from chloroform in amber-colored needles, melting at 215–217° C.

Calculated for $C_8N_2O_2Cl_2$: Cl, 31.25; N, 12.34. Found: Cl, 31.71, 31.88; N, 11.88, 11.81.

I claim:

1. The process of preparing 2,3-dicyano-5,6-dichlorobenzoquinone which comprises the steps of: introducing gaseous chlorine into a solution of 2,3-dicyanohydroquinone in acetic acid heated to the temperature of reflux, said introduction of chlorine gas being continued until the reaction product initially formed in said solution as an insoluble product goes into solution; cooling the resulting clear solution to room temperature; adding chloroform thereto, thereby causing the separation and precipitation of 2,3-dicyano-5,6-dichlorohydroquinone therein; separating off said insoluble 2,3-dicyano-5,6-dichlorohydroquinone; adding benzene containing charcoal suspended therein to the resulting clear solution, and heating and agitating the resulting solution in contact with said charcoal; and removing said charcoal and treating said solution to recover 2,3-dicyano-5,6-dichlorobenzoquinone therefrom.

2. The process defined in claim 1 wherein said step of heating and agitating in contact with charcoal is carried out by having additionally present therein a solid drying agent and an acid acceptor.

3. The process of preparing 2,3-dicyano-5,6-dichlorobenzoquinone which comprises the steps of: introducing gaseous chlorine into a solution of 2,3-dicyanohydroquinone in acetic acid heated to the temperature of reflux, said introduction of chlorine gas being continued until the reaction product initially formed in said solution as an insoluble product goes into solution; cooling the resulting clear solution to room temperature; adding chloroform thereto, thereby causing the separation and precipitation of 2,3-dicyano-5,6-dichlorohydroquinone therein; separating off said insoluble 2,3-dicyano-5,6-dichlorohydroquinone; adding benzene containing charcoal suspended therein to the resulting clear solution, and heating and agitating the resulting solution in contact with said charcoal; removing said charcoal and concentrating the resulting clear solution; and adding a precipitating agent thereto, thereby precipitating out 2,3-dicyano-5,6-dichlorobenzoquinone.

4. The process of preparing 2,3-dicyano-5,6-dichlorobenzoquinone which comprises the steps of: introducing gaseous chlorine into a solution of 2,3-dicyanohydroquinone in acetic acid heated to the temperature of reflux, said introduction of chlorine gas being continued until the reaction product initially formed in said solution as an insoluble product goes into solution; cooling the resulting clear solution to room temperature; adding chloroform thereto, thereby causing the separation and precipitation of 2,3-dicyano-5,6-dichlorohydroquinone therein; separating off said insoluble 2,3-dicyano-5,6-dichlorohydroquinone and evaporating the resulting clear solution to syrup consistency; adding benzene containing charcoal suspended therein to said syrup, and heating and agitating the resulting solution in contact with said charcoal; removing said charcoal and concentrating the resulting clear solution; and adding chloroform thereto, thereby precipitating out 2,3-dicyano-5,6-dichlorobenzoquinone.

References Cited in the file of this patent

Leibigs: "Annalen der Chemie" Band 349, pages 45–66 (1906).

Bernthsen et al.: "Organic Chemistry," 2nd edition, page 499 (1941) (Blackie).

Fieser et al.: "Organic Chemistry," 3rd edition, page 721 (1956) (Reinhold).